United States Patent
Jana et al.

(10) Patent No.: US 8,799,377 B2
(45) Date of Patent: Aug. 5, 2014

(54) METHOD AND APPARATUS FOR MOBILE PRESENCE AGGREGATION

(75) Inventors: Rittwik Jana, Parsippany, NJ (US); Kevin Donnellan, North Brunswick, NJ (US); Serban Vadim Jora, Roanoke, VA (US); John Murray, Denville, NJ (US); Christopher W. Rice, Parsippany, NJ (US); Richard W. Wright, Newton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 382 days.

(21) Appl. No.: 12/967,951

(22) Filed: Dec. 14, 2010

(65) Prior Publication Data

US 2012/0150974 A1    Jun. 14, 2012

(51) Int. Cl.
*G06F 15/16*    (2006.01)

(52) U.S. Cl.
USPC .......................... 709/206; 709/203; 709/230

(58) Field of Classification Search
CPC ........................................................ H04L 67/24
USPC .................. 709/206–207, 223, 230, 246, 203
See application file for complete search history.

(56) References Cited

U.S. PATENT DOCUMENTS

| | | | |
|---|---|---|---|
| 7,769,154 B1* | 8/2010 | Craft et al. ............... | 379/207.12 |
| 8,306,057 B1* | 11/2012 | Khan ............................ | 370/466 |
| 2004/0172481 A1* | 9/2004 | Engstrom ..................... | 709/239 |
| 2004/0267942 A1* | 12/2004 | Maes ............................ | 709/228 |
| 2005/0083904 A1* | 4/2005 | Khartabil et al. ............. | 370/351 |
| 2005/0262195 A1* | 11/2005 | Ono et al. ..................... | 709/203 |
| 2006/0246880 A1* | 11/2006 | Baldwin et al. ............. | 455/414.2 |
| 2006/0259958 A1* | 11/2006 | Jennings et al. ................. | 726/6 |
| 2007/0226357 A1* | 9/2007 | McMurry et al. ............. | 709/229 |
| 2007/0233875 A1* | 10/2007 | Raghav et al. ................ | 709/227 |
| 2007/0276909 A1* | 11/2007 | Chavda et al. ............... | 709/204 |
| 2009/0070410 A1* | 3/2009 | Gilfix et al. .................... | 709/203 |
| 2009/0198638 A1* | 8/2009 | Sakurai ........................ | 709/224 |
| 2010/0075673 A1* | 3/2010 | Colbert et al. ............. | 455/435.1 |
| 2010/0145676 A1* | 6/2010 | Rogers .............................. | 704/9 |
| 2010/0216489 A1* | 8/2010 | Green et al. ............... | 455/456.3 |
| 2012/0023238 A1* | 1/2012 | Bouthemy et al. ............ | 709/227 |

\* cited by examiner

*Primary Examiner* — Philip B Tran

(57) ABSTRACT

A method, computer readable medium for performing mobile presence aggregation are disclosed. For example, the method acquires presence information associated with a user, packages the presence information into a message and forwards the message containing the presence information via a non-session initiated protocol based transport protocol to a presences access layer server. In another embodiment, the method receives a message containing presence information in a non-session initiated protocol based transport protocol, identifies the presence information in the message, translates the presence information into a presence information data format and forwards the presence information in the presence information data format to a presence server.

14 Claims, 4 Drawing Sheets

METHOD AND APPARATUS FOR MOBILE PRESENCE AGGREGATION

The present disclosure relates generally to effecting mobile presence aggregation.

BACKGROUND

Presence information is a status indicator that conveys ability and willingness of a potential communication. Presence systems are used today to acquire information about a user. Currently, presence services mostly utilize session initiation protocol (SIP) to transport presence information from a user device to a server in the network. A presence aggregation service collects presence data from multiple sources and mobile devices to create an aggregated view of a user's presence in a centralized network presence server. Enterprise and third party unified communications platforms can access the aggregation server to acquire users' presence information. However, relying on SIP to publish presence updates has many drawbacks.

For example, some mobile phones do not support SIP. In addition, due to the fact that enterprises may operate over many cellular operators or WiFi hot spots, SIP support may vary. Requiring a SIP stack in the mobile device provides additional demands on the native platform and could restrict deployment of presence enabled applications. SIP clients can also be very costly and middleware components are generally more difficult to deploy than application level components.

In addition, SIP protocol being more verbose than other messaging protocols tends to transmit a relatively large number of messages. As a result, SIP consumes a relatively high level of bandwidth. The exchange of a relatively large number of messages also has a detrimental effect on battery life of the mobile device.

SUMMARY

In one embodiment, the present disclosure teaches a method and computer readable medium for performing mobile presence aggregation. In one embodiment, the method comprises acquiring presence information associated with a user, packaging the presence information into a message and forwarding the message containing the presence information via a non-session initiated protocol based transport protocol to a presences access layer server. In another embodiment, the method comprises receiving a message containing presence information in a non-session initiated protocol based transport protocol, identifying the presence information in the message, translating the presence information into a presence information data format and forwarding the presence information in the presence information data format to a presence server.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
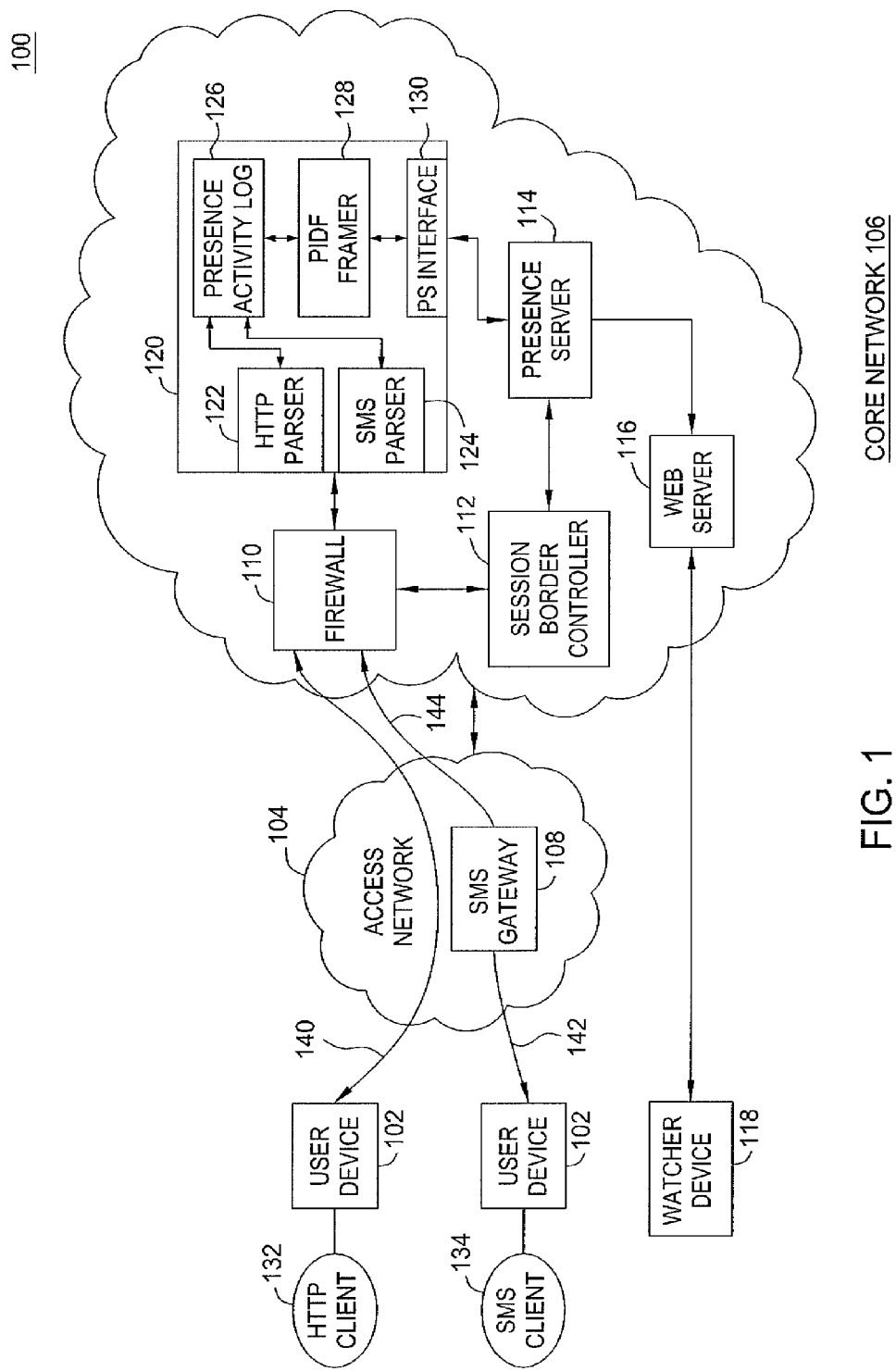
FIG. 1 illustrates one example of a communications network architecture.

Presence information provides information about a user's availability and the user's willingness to communicate. In one embodiment, presence information may include, a user's status (e.g., busy, available, etc.), a user's location, an activity the user is currently engaged in (e.g., on a telephone call, playing a video game, in a meeting, etc.) or a user's mood (e.g., happy, sad, etc.).

Currently, presence information is provided to a presence server using session initiation protocol (SIP). However, SIP generally requires a relatively large number of messages to be exchanged to establish the session and transfer the presence information. As a result, SIP consumes bandwidth and battery power from mobile devices.

To resolve this issue, the present disclosure takes advantage of non-SIP based transport protocols or compact message sets that primarily have small overhead in terms of consumed bandwidth and power, e.g., short message service (SMS), hypertext transfer protocol (HTTP) and Extensible Messaging Presence Protocol (XMPP). The non-SIP based transport protocols reduce the number of messages that need to be exchanged between a user device and a server in the network to provide presence information of the user.

In addition, the size of the non-SIP based transport protocol messages only require considerably smaller payloads rather than the complete presence information data format (PIDF) payloads as required by SIP. For example, the non-SIP based transport protocols can send messages that are up to 90% smaller than the same message sent via SIP. As a result, less bandwidth is consumed, battery life of mobile devices is extended and the costs are reduced due to the cost of the equipment necessary to use the of non-SIP based transport protocols.

One way of achieving the smaller overhead using non-SIP based transport protocols or compact message sets is to use a compact dictionary that abbreviates complete present information used by SIP protocols. One example of a compact dictionary that may be used by non-SIP based transport protocols is provided below in TABLE 1:

TABLE 1

EXAMPLE COMPACT DICTIONARY

| Event | Abbreviated Mobile Form | Presence Element |
|---|---|---|
| Phone Register/ Deregister | When Registration complete: RG=T, When Deregistering: RG=F | Network Availability - [XSD_pidfOMA, <network-availability> e.g.: (under device) <op:network-availability>    <op:network id="IMS">       <op:active/>    </op:network> </op:network-availability> |
| Call Activity | When call started: CA=T DT_C = 2010-02-15T16:37:50 When call ended: CA=F | Under person: <rdip:activities>    <rpid:on-the-phone/> </rpid:activities> |

TABLE 1-continued

EXAMPLE COMPACT DICTIONARY

| Event | Abbreviated Mobile Form | Presence Element |
|---|---|---|
| Last Interaction | DT_C = 2010-02-15T17:17:09<br>L=2010-02-15T17:17:09 | Under device:<br><rpid:user-input idle-threshold="120" last-input="2010-02-15T12:40:37-05:00">idle</rpid:user-input> |
| CellID | CellID=31696<br>DT_CI=2010-02-15T17:22:10 | Under person:<br><rpid:place-type from="2010-02-15T13:36:42-05:00"<br><lt:office /><br></rpid:place-type> |
| Time-zone | TZ=-05 | Under person:<br><rpid:time-offset>120</rpid:time-offset> |

It should be noted that Table 1 is provided as an example only. That is, the compact dictionary may include more entries or abbreviations than what is shown in Table 1 as examples. In other words, Table 1 should not be interpreted as limiting the number or types of abbreviations that may be included in the compact dictionary.

FIG. 1 is a block diagram depicting one example of a communications network architecture 100 related to the current disclosure. In one embodiment, the communications network architecture 100 includes one or more user devices 102, an access network 104 and a core network 106. The core network 106 may also be referred to as a presence enabler network.

In one embodiment, the user devices 102 may be any type of user device, such as for example, a cellular phone, a smart phone, a personal digital assistant, a WiFi enabled device, a wireless tablet device, a netbook, a laptop, a desktop computer and the like. In one embodiment, the user device 102 is configured to be able to collect presence information of the user. The user device 102 may be configured to automatically detect the presence information. In one embodiment, presence agents may be used to automatically detect the presence information. In another embodiment, the user device 102 may detect activated functions of the user device 102, such as for example, synchronous events (e.g., events sent when triggered by an activity such as starting a call), phone registration/deregistration (e.g., indication of whether the phone is actively registered on a cellular network and capable of receiving calls), call activity (e.g., indication of whether the user is on the phone or not), last communication (e.g., time tag of when the communication such as a phone call, occurrence of an instant message or an SMS message, periodic events (e.g., events collected and sent periodically), cell identification (CellID) (e.g., ID of latest cell site the user device 102 is camped on), time zone (e.g., time zone the user device 102 is currently in), avatars used by the user (e.g., indication of moods, e.g., a happy avatar versus a sad avatar), and the like. If the presence information is not collected automatically, the presence information may be collected via interaction with the user (e.g., the user manually enters the presence information via an interface).

In one embodiment, the user device 102 may be configured with a non-SIP based transport protocol client. The non-SIP based transport protocol may be any type of store and forward type service. In other words, the non-SIP based transport protocol does not store state information. One type of non-SIP based transport protocol with these properties is SMS. In another embodiment, the non-SIP based transport protocol may be HTTP.

Depending on the type of non-SIP based transport protocol that is used, the user device 102 may be configured with a HTTP client 132, an SMS client 134 or both an HTTP client 132 and an SMS client 134. In one embodiment, the user device 102 may be configured to also include a SIP client (not shown). In one embodiment, the HTTP client 132 and the SMS client 134 are responsible for acquiring the presence information of the user and packaging the presence information into a message using the respective non-SIP based transport protocol.

In one embodiment, a user device 102 that is configured with both the HTTP client 132 and the SMS client 134 may be configured to dynamically select the appropriate non-SIP based transport protocol. Dynamically may be defined as the ability to select any non-SIP based transport protocol at any time. For example, the non-SIP based transport protocol may be dynamically selected based upon a user's selection, carrier support for data at the current location of the user device 102 (e.g., if SMS is not available or supported by one carrier at the location, the message may be forwarded via HTTP or vice versa) or based upon cost considerations of sending a message via one of the non-SIP based transport protocols (e.g., at a given time or location it may be cheaper to forward the message via HTTP rather than SMS or the user may have an unlimited data plan, but a limited number of allotted SMS messages under their plan so it would be more cost effective to forward the message via HTTP if their total allotment of SMS messages was already consumed).

Notably, the non-SIP based transport protocol message is initiated by the user device 102. That is, the user does not create an SMS message that includes their presence information, such as for example, by pressing commands on the user device 102 to create a new message. The user also does not send the SMS message to another user or the server by entering any commands on the user device 102. There is no interaction with the user for creating and forwarding the message that includes the presence information. The user also does not enter their presence information via a webpage interface that was provided to the user via an HTTP session to send their presence information via the webpage interface. The only interaction with the user may be to acquire the presence information, if necessary or appropriate. Once the presence information is acquired, the user device 102 is automatically responsible for initiating a process for creating a message in an appropriate non-SIP based transport protocol and forwarding the message.

In addition, in one embodiment, the non-SIP based transport protocol message may be created by reference to a compact dictionary as illustrated by TABLE 1 above as an example. For example, depending on the presence information that is collected, the non-SIP based transport protocol message may use the compact dictionary to create an abbreviated form of the complete presence information required by PIDF payloads required by SIP. As a result, the non-SIP based transport protocol message is more compact, thereby consuming less bandwidth and power.

The access network 104 may be any type of access network, such as for example, a cellular network, a broadband cable access network, a local area network (LAN) network, a wireless access network (WAN), a $3^{rd}$ party network and the like. In one embodiment, the access network 104 may comprise an SMS gateway 108. The SMS gateway 108 enables SMS messages forwarded by a user device 102 to be delivered to the core network 106.

In one embodiment, the core network 106 comprises a firewall 110, a session border controller 112, a presence server 114, a web server 116 and a presence access layer (PAL) server 120. In one embodiment, the PAL server 120 may comprise an HTTP parser 122, an SMS parser 124, a presence activity log 126, a PIDF framer 128 and a presence server (PS) interface 130.

Notably, the HTTP parser 122 and the SMS parser 124 were not part of the previous PAL servers because the previous PAL servers all used SIP to communicate with the user device 102. However, to enable the use of HTTP and SMS to aggregate presence information, the PAL server 120 is modified to include the HTTP parser 122 and the SMS parser 124.

In one embodiment, depending on whether the message from the user device 102 is sent via HTTP or SMS, the message will be received by the PAL server via the respective parser, for example, either the HTTP parser 122 or the SMS parser 124. If HTTP is used, the message may be forwarded via the access network 104 to the core network 106 as shown by line 140. However, if SMS is used, the message may be forwarded via the SMS gateway 108 in the access network 104 to the core network 106 as shown by line 142 and 144.

Once the PAL server 120 receives the message, the PAL server 120 identifies the presence information in the message via the respective parser. Once the presence information is identified, the presence information may be logged in the presence activity log 126 and then translated by the PIDF framer 128. In one embodiment, the PIDF framer 128 formats the presence information into a format such that the presence server 114 may publish the presence information on the web server 116.

In one embodiment, the presence information in the appropriate format is forwarded to the presence server via the PS interface 130. In one embodiment, the PS interface 130 and the presence server 114 communicate via SIP.

In one embodiment, once the presence information is published on the web server 116, a watcher device 118 may view the presence information. In one embodiment, the watcher device 118 may be another cellular phone, a smart phone, a personal digital assistant, a WiFi enabled device, a wireless a tablet device, a netbook, a laptop, a desktop computer and the like, that is interested in the status of the user of the user device 102.

The communications network architecture 100 may also include additional hardware or network components that are not illustrated. In other words, FIG. 1 only illustrates a simplified cellular communications network architecture 100 and should not be interpreted as a limitation of the present disclosure.

Figure 2:
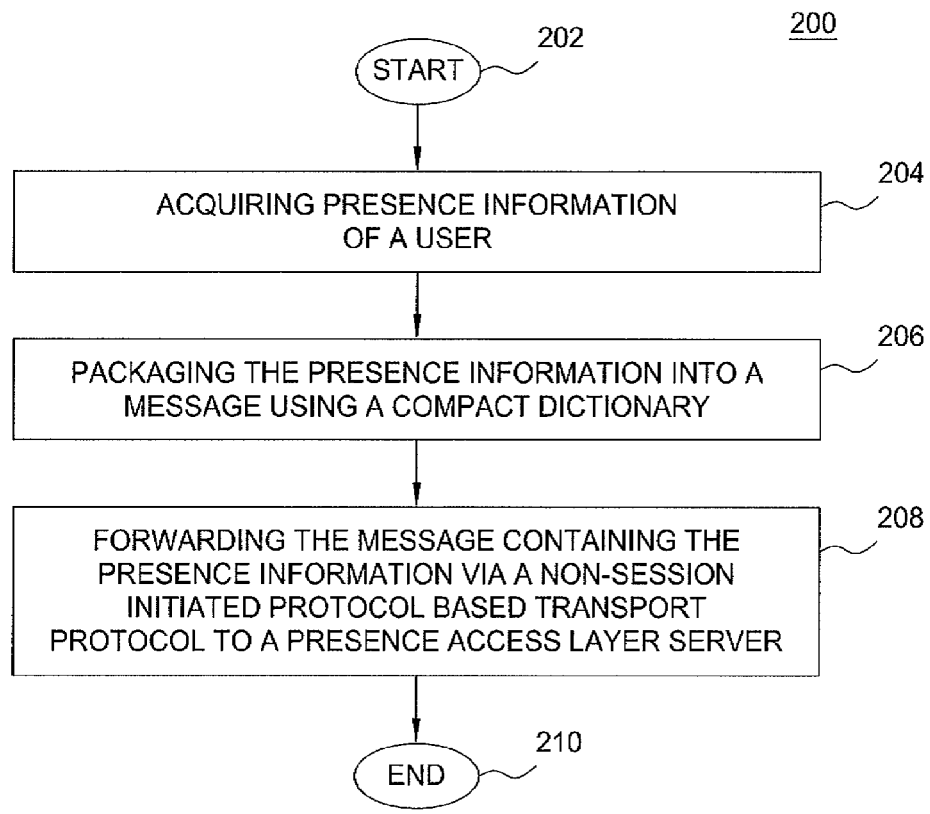
FIG. 2 illustrates a high level flowchart of one embodiment of a method for performing mobile presence aggregation.

FIG. 2 illustrates a high level flowchart of a method 200 for performing mobile presence aggregation. In one embodiment, the method 200 may be implemented by the user device 102 or a general purpose computer having a processor, a memory and input/output devices as discussed below with reference to FIG. 4.

The method 200 begins at step 202 and proceeds to step 204. At step 204, the method acquires presence information of a user. In one embodiment, the presence information may be automatically acquired by the user device (e.g., via presence collection agents or based on activated functions of the user device 102) or collect it via interaction with the user (e.g., the user manually enters the presence information via an interface).

At step 206, the method 200 packages the presence information into a message using a compact dictionary. Depending on which non-SIP based transport protocol is being used, the presence information is packaged into a compact message with the necessary information for a message in the appropriate non-SIP based transport protocol.

For example, a compact dictionary as illustrated by example in TABLE 1 may be used to create the compact message. In other words, the complete presence information that is required in the PIDF payload by SIP may be abbreviated using the compact dictionary. This results in a smaller message that may have advantages of consuming less bandwidth and power.

It should be noted that the creation of the message is initiated by the user device and not by the user. That is, the user does not request the message to be created by interacting with an interface of the user device. Rather, once the presence information is collected the user device 102 may initiate creation of the message automatically and the user need not take any further action.

At step 208, the method 200 forwards the message containing the presence information via a non-SIP based transport protocol to a PAL server. As discussed above, the PAL server is modified to include an SMS parser and an HTTP parser. As a result, the PAL server is able to identify presence information from the message and have the presence information translated at the PAL server via the PIDF framer. In other words, bandwidth and battery life is saved by sending the message in a plain text payload format rather than PIDF and having the message converted into PIDF at the PAL server. The method 200 ends at step 210.

Figure 3:
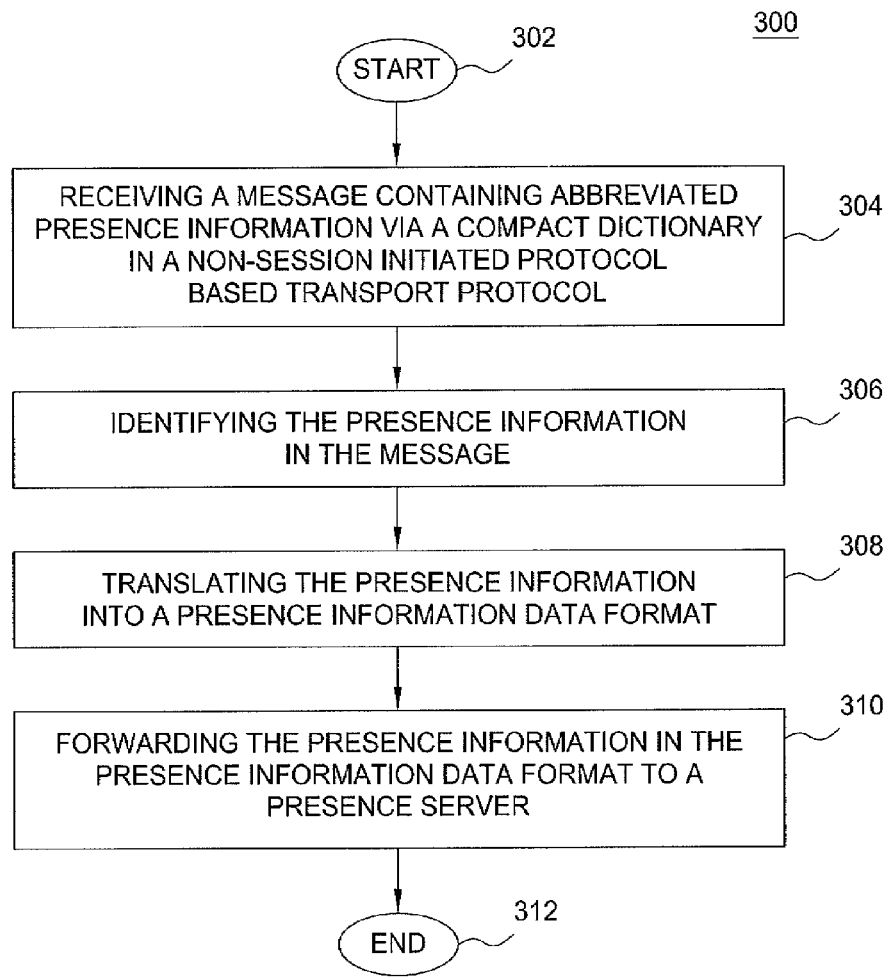
FIG. 3 illustrates a high level flowchart of another embodiment of a method for performing mobile presence aggregation.

FIG. 3 illustrates a detailed flowchart of a method 300 for another embodiment for performing mobile presence aggregation. In one embodiment, the method 300 may be implemented by the PAL server 120 or a general purpose computer having a processor, a memory and input/output devices as discussed below with reference to FIG. 4.

The method 300 begins at step 302 and proceeds to step 304. At step 304, the method 300 receives a message containing abbreviated presence information via a compact dictionary in a non-SIP based transport protocol. For example, the message may be sent by a user device via SMS or HTTP. In addition, the presence information may have been abbreviated using a compact dictionary as illustrated by example in TABLE 1 above.

At step 306, the method 300 identifies the presence information in the message. As discussed above, the PAL server is configured with an SMS parser and an HTTP parser. Depending on which type of non-SIP based transport protocol is used, the message is received via the appropriate parser to read the message and identify the presence information.

At step 308, the method 300 translates the presence information into a PIDF. For example, the PIDF framer may translate the presence information into PIDF such that the presence server will be able to recognize the presence information and publish it accordingly. It should be noted that the PAL server also has access to its own compact dictionary to perform the necessary translation. By providing the PAL server the ability to translate presence information from non-SIP based transport protocols that do not require the message payload to be in PIDF, less bandwidth is consumed and battery life of the user device is saved.

At step 310, the method 300 forwards the presence information in the PIDF to a presence server. In one embodiment, the presence information in PIDF is sent to the presence server via SIP. The presence server may then publish the presence information onto a web server, where the presence information may be accessed by $3^{rd}$ parties, such as for example, a watcher device. The method 300 ends at step 312.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 4:
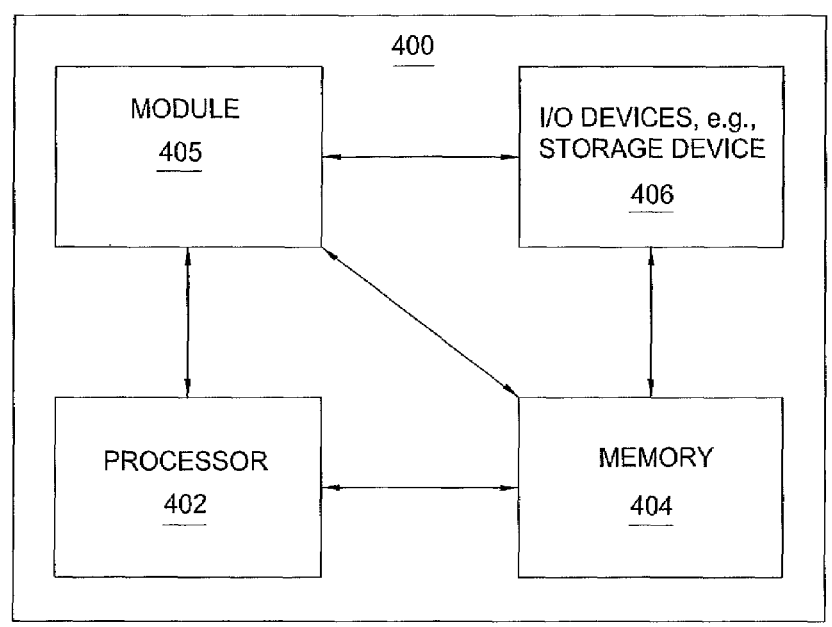
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for performing mobile presence aggregation, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for performing mobile presence aggregation can be loaded into memory 404 and executed by processor 402 to implement the functions as discussed above. As such, the present method 405 for performing mobile presence aggregation (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forwarding presence information, comprising:
acquiring, via a processor of a mobile device, the presence information associated with a user;
packaging, via the processor, the presence information into a message using a compact dictionary, wherein the message comprises an abbreviated form of the presence information; and
forwarding, via the processor, the message containing the presence information that is abbreviated via a non-session initiated protocol based transport protocol to a presences access layer server, wherein the non-session initiated protocol based transport protocol does not store state information, wherein the presences access layer server is for translating the message in the non-session initiated protocol based transport protocol into a presence information data format that is used by a presence server to publish the presence information.

2. The method of claim 1, wherein the non-session initiated protocol based transport protocol comprises a store and forward messaging service.

3. The method of claim 2, wherein the message comprises a short message service text message.

4. The method of claim 1, wherein the non-session initiated protocol based transport protocol comprises a hypertext transfer protocol.

5. The method of claim 1, further comprising:
dynamically selecting the non-session initiated protocol based transport protocol.

6. A non-transitory computer-readable medium storing a plurality of instructions which, when executed by a processor of a mobile device, cause the processor to perform operations for forwarding presence information, the operation comprising:
acquiring the presence information associated with a user;
packaging the presence information into a message using a compact dictionary, wherein the message comprises an abbreviated form of the presence information; and
forwarding the message containing the presence information that is abbreviated via a non-session initiated protocol based transport protocol to a presences access layer server, wherein the non-session initiated protocol based transport protocol does not store state information, wherein the presences access layer server is for translating the message in the non-session initiated protocol based transport protocol into a presence information data format that is used by a presence server to publish the presence information.

7. The non-transitory computer readable medium of claim 6, wherein the non-session initiated protocol based transport protocol comprises a store and forward messaging service.

8. The non-transitory computer readable medium of claim 7, wherein the message comprises a short message service text message.

9. The non-transitory computer readable medium of claim 6, wherein the non-session initiated protocol based transport protocol comprises a hypertext transfer protocol.

10. The non-transitory computer readable medium of claim 6, further comprising:
dynamically selecting the non-session initiated protocol based transport protocol.

11. A method for forwarding presence information, comprising:
receiving, via a processor of a presence access layer server, a message containing the presence information, wherein the presence information that is received comprises the presence information that is abbreviated via a compact dictionary, wherein the message is received via a non-session initiated protocol based transport protocol, wherein the non-session initiated protocol based transport protocol does not store state information;
identifying, via the processor, the presence information in the message;
translating, via the processor, the presence information into a presence information data format that is used by a presence server to publish the presence information; and
forwarding, via the processor, the presence information in the presence information data format to the presence server.

12. The method of claim 11, wherein the non-session initiated protocol based transport protocol comprises a store and forward messaging service.

13. The method of claim 12, wherein the message comprises a short message service text message.

14. The method of claim 11, wherein the non-session initiated protocol based transport protocol comprises a hypertext transfer protocol.

* * * * *

UNITED STATES PATENT AND TRADEMARK OFFICE
CERTIFICATE OF CORRECTION

| | | |
|---|---|---|
| PATENT NO. | : 8,799,377 B2 | Page 1 of 1 |
| APPLICATION NO. | : 12/967951 | |
| DATED | : August 5, 2014 | |
| INVENTOR(S) | : Rittwik Jana et al. | |

It is certified that error appears in the above-identified patent and that said Letters Patent is hereby corrected as shown below:

On the Title page Item 73, After the word "Assignee:" delete "AT&T Intellectual Property II, L.P." and insert instead --AT&T Intellectual Property, I, L.P.--

Signed and Sealed this
First Day of September, 2015

Michelle K. Lee
*Director of the United States Patent and Trademark Office*